Aug. 1, 1933.  N. DEGEN  1,920,364
SURFACING MACHINE
Filed Nov. 27, 1931  2 Sheets-Sheet 1
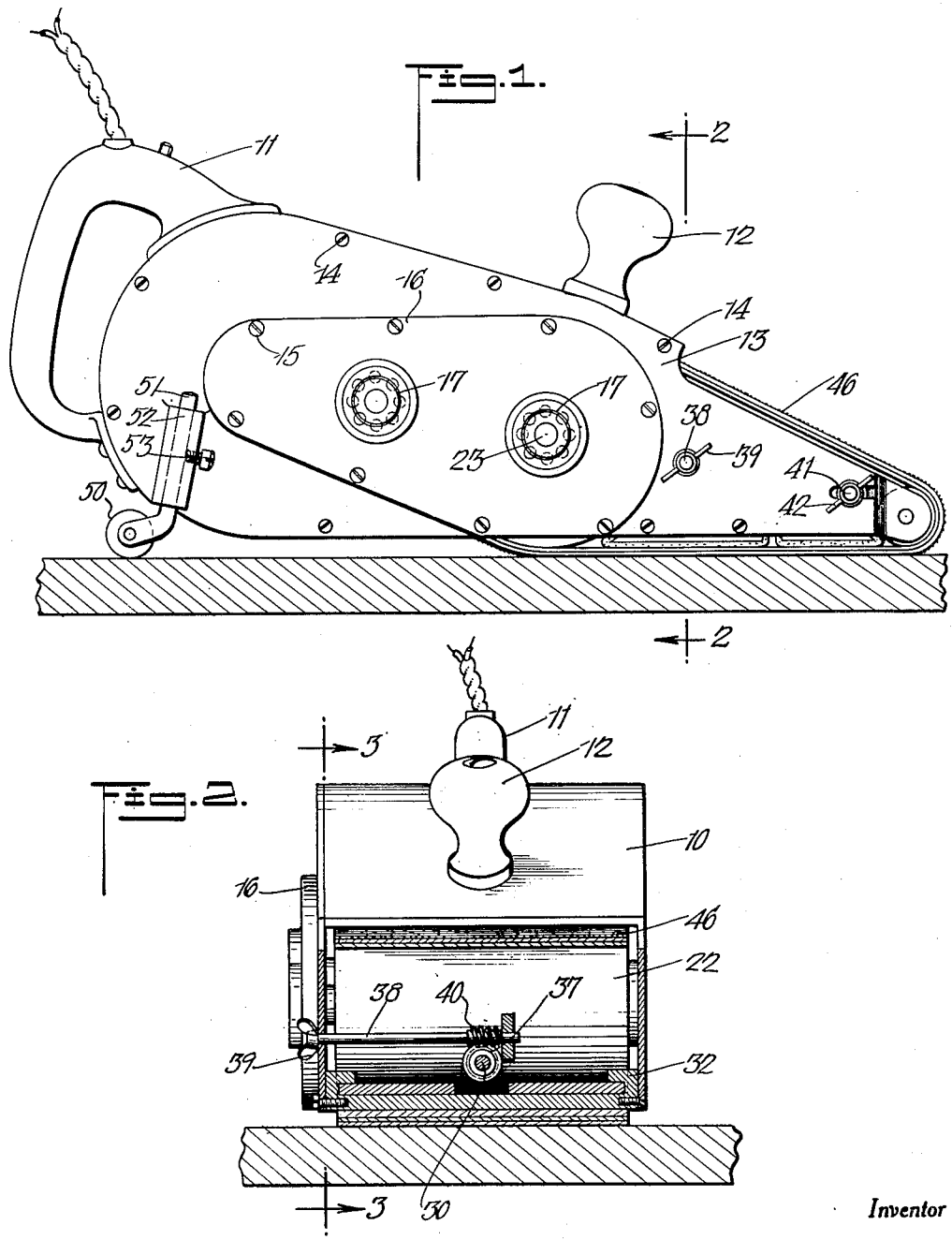
Inventor
NICKLOUS DEGEN.
By Clarence A. O'Brien
Attorney

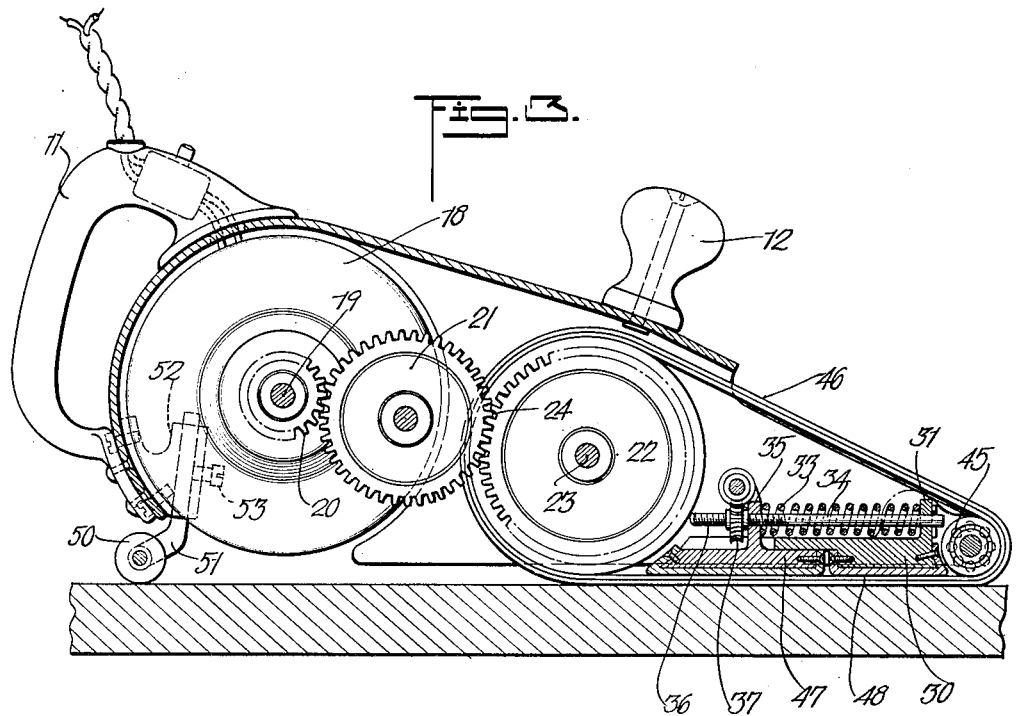
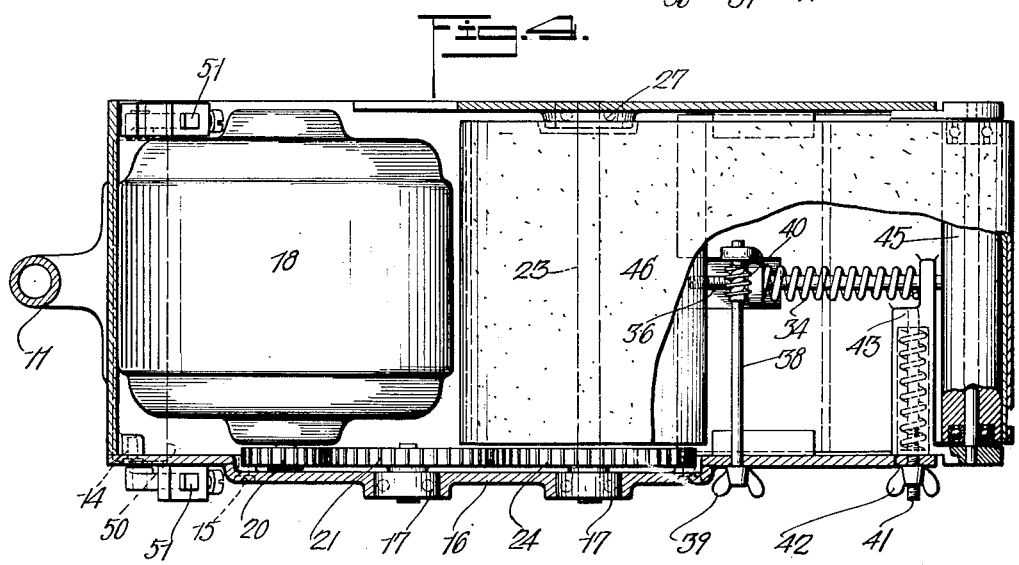

Patented Aug. 1, 1933

1,920,364

UNITED STATES PATENT OFFICE 1,920,364

SURFACING MACHINE

Nicklous Degen, Mason City, Iowa

Application November 27, 1931
Serial No. 577,647

3 Claims. (Cl. 51—170)

The present invention relates to new and useful improvements in surfacing machines, and more particularly it pertains to a machine for surfacing and resurfacing floors.

It is one of the objects of the present invention to provide a new and novel machine of the belt type.

A further object of the invention resides in a new and novel mechanism for mounting an abrading belt in such a manner that it may be adjusted relative to the machine.

A still further object of the invention resides in the provision of a novel mechanism whereby the tension of the abrading belt may be adjusted.

With the above and several other objects in view which will appear as the nature of the invention is better understood, reference will be had to the accompanying drawings wherein;

Figure 1 is a view in side elevation of a machine constructed in accordance with the present invention, Figure 2 is a transverse vertical sectional view taken on the line 2—2 of Figure 1, Figure 3 is a vertical sectional view taken on the line 3—3 of Figure 2, and;

Figure 4 is a view partly in horizontal section and partly broken away and illustrating certain of the parts of the machine in top plan.

Referring more particularly to the drawings, a machine constructed in accordance with the present invention comprises a housing 10 having manipulating handles 11 and 12. The housing 10 preferably has one removable side plate 13 secured in position by means of screws or the like 14 and by means of which the interior of the housing may be reached.

A second plate 16 is removably attached to the plate 13 by means of screws or the like 15 and this plate 16 forms the supporting means for bearings or the like 17 in which certain parts of the machine are mounted as will be hereinafter more specifically described.

Mounted within the housing, there is a motor 18 and this motor is preferably of the electric type. The motor 18 has a shaft 19 upon which is keyed a gear 20 and said gear 20 meshes with a gear 21 mounted in one of the bearings 17 as best illustrated in Figure 4. The reference character 22 designates a roller mounted upon a shaft 23 which extends transversely of the housing and which shaft carries a gear 24 by means of which it is driven. One end of the shaft 23 is mounted in the other bearing 17 of the plate 16 and the opposite end of the shaft is mounted in a bearing 27 at the opposite side of the housing.

As best illustrated in Figures 2 and 3, there is a plate 30 mounted at the forward end of the housing and said plate has an upstanding lug or the like 31 at its forward edge. The plate 30 is slidably mounted in guides 32 and is moved forwardly by means of a coiled spring 33 which surrounds a bolt 34 which passes through the lug 31 at the forward end of the plate 30. The other end of the bolt 34 extends through a stationary lug 35 and is screw threaded as at 36 for the reception of a worm gear or the like 37. Extending transversely of the housing, there is a shaft 38 provided with a wing nut or similar operating means 39 upon its outer end, its inner end having a worm gear 40 which meshes with the worm wheel 37 heretofore mentioned and serves as means for rotating the same to move the bolt 34 and permit the spring 33 to move the sliding plate 30 forwardly to increase the tension upon the abrading belt as will be hereinafter described.

Means is also provided for adjusting the plate 30 laterally of the housing and this means comprises a bolt 41 threaded for the reception of a wing nut 42 and which is connected at its inner end to a lug or the like 43 carried by the plate 30 as best illustrated in Figure 4.

The plate 30 forms the support for an idle roller 45 and passing around the idle roller 45 and the roller 22 heretofore mentioned, there is an abrading belt of sand paper or the like designated 46. Interposed between the plate 30 and the bottom 47 of the housing, there may be suitable cushions 48 for the purpose of backing up the abrading belt 46 during the operation.

The machine operates in the following manner:—

The current to the electric motor 18 being turned on, said motor drives through the medium of the gears 20 and 21, the gear 24 and thus causes rotation of the roller 22. Rotation of the roller 22 drives the abrading belt 46 and the plates 30 and 47 press the abrading belt into contact with the surface to be operated upon.

If it is desired to increase the tension under which the abrading belt operates, the shaft 38 is rotated driving the screw 40 and the gear 37 which moves the plate 30 forwardly of the housing and by movement of the idle roller 45 carried by the plate, increases or decreases the tension upon the abrading belt depending upon the direction of rotation of the bolt 34.

At the rear of the machine, I provide two supporting rollers 50 arranged one at each side thereof. Each of these supporting rollers 50 is carried by an arm 51 slidably mounted in a housing 52 and capable of adjustment by means of set screws, bolts or the like 53 as best illustrated in Figures 1 and 3 of the drawings.

From the foregoing it will be apparent that the present invention provides new and novel mechanism or construction in a surfacing machine which construction contributes to a more successful and better operating device than heretofore provided.

While the invention has been illustrated in what may be termed a preferred form, it is to be understood that it is not to be limited to the specific construction herein shown, and that it may be practiced in other forms without departing from the spirit thereof.

Having thus described the invention, what is claimed as new and what it is desired to secure by Letters Patent of the United States, is:

1. In a surfacing machine, a housing, an abrading belt, a pair of rollers mounted in the housing for mounting said abrading belt, one of said rollers being an idle roller, a plate slidably mounted in the housing for supporting said idle roller, means for driving the other roller to drive the belt, means for adjusting said plate transversely of the housing, and resilient means for moving said plate longitudinally of the housing to place the abrading belt under tension.

2. In a surfacing machine, a housing a pair of rollers in said housing, and an abrading belt passing over said rollers, means for rotating one of said rollers, a plate slidably supported in the housing and carrying the other roller, said plate having an upstanding ear at its forward end, a stationary upstanding ear in rear of the plate, a rod passing through the ears having its rear end threaded, a worm gear having a threaded hub engaging the threads of the rod, a transverse shaft passing through one side of the housing and having a handle at its outer end, a worm on the shaft engaging the worm gear, a spring on the rod having its ends engaging the ears.

3. In a surfacing machine, a housing a pair of rollers in said housing, and an abrading belt passing over said rollers, means for rotating one of said rollers, a plate slidably supported in the housing and carrying the other roller, said plate having an upstanding ear at its forward end, a stationary upstanding ear in rear of the plate, a rod passing through the ears having its rear end threaded, a worm gear having a threaded hub engaging the threads of the rod, a transverse shaft passing through one side of the housing and having a handle at its outer end, a worm on the shaft engaging the worm gear, a spring on the rod having its ends engaging the ears, a second rod transversely arranged and having its inner end connected to a part of the sliding plate and one side of the housing having a slot therein through which the second rod passes, a nut threaded on the outer end of said second rod and a spring on said second rod and one end engaging a wall of the housing and its other end a part of the sliding plate for adjusting the plate transversely.

NICKLOUS DEGEN.